(12) United States Patent
Kamei (10) Patent No.: US 11,879,029 B2
(45) Date of Patent: Jan. 23, 2024

(54) POLYMERIZABLE COMPOSITION, CYCLOOLEFIN-BASED POLYMER, AND METAL/RESIN COMPOSITE

(71) Applicant: RIMTEC Corporation, Tokyo (JP)

(72) Inventor: Nobuhito Kamei, Tokyo (JP)

(73) Assignee: RIMTEC CORPORATION, Tokyo (JP)

( * ) Notice: Subject to any disclaimer, the term of this patent is extended or adjusted under 35 U.S.C. 154(b) by 64 days.

(21) Appl. No.: 17/630,573

(22) PCT Filed: Jul. 31, 2020

(86) PCT No.: PCT/JP2020/029536
§ 371 (c)(1),
(2) Date: Jan. 27, 2022

(87) PCT Pub. No.: WO2021/024956
PCT Pub. Date: Feb. 11, 2021

(65) Prior Publication Data
US 2022/0259355 A1    Aug. 18, 2022

(30) Foreign Application Priority Data

Aug. 6, 2019 (JP) ................................. 2019-144771

(51) Int. Cl.
| | | |
|---|---|---|
| C08F 236/20 | (2006.01) | |
| B32B 15/082 | (2006.01) | |
| B32B 15/085 | (2006.01) | |
| B32B 15/20 | (2006.01) | |
| B32B 27/20 | (2006.01) | |
| B32B 27/30 | (2006.01) | |
| B32B 27/32 | (2006.01) | |
| C09J 147/00 | (2006.01) | |

(52) U.S. Cl.
CPC .......... *C08F 236/20* (2013.01); *B32B 15/082* (2013.01); *B32B 15/085* (2013.01); *B32B 15/20* (2013.01); *B32B 27/20* (2013.01); *B32B 27/308* (2013.01); *B32B 27/325* (2013.01); *C09J 147/00* (2013.01); *B32B 2307/306* (2013.01)

(58) Field of Classification Search
CPC ...... C08F 236/20; C09J 147/00; B32B 27/20; B32B 15/082; B32B 2307/306; B32B 27/325; B32B 15/085; B32B 15/20; B32B 27/308

USPC ........................................................... 524/548
See application file for complete search history.

(56) References Cited

U.S. PATENT DOCUMENTS

| | | | |
|---|---|---|---|
| 6,136,499 A | 10/2000 | Goodall et al. | |
| 6,232,417 B1 | 5/2001 | Rhodes et al. | |
| 6,790,579 B1 | 9/2004 | Goodall et al. | |
| 2002/0128408 A1* | 9/2002 | Goodall ................. | C08G 61/08 526/171 |
| 2002/0136982 A1 | 9/2002 | Goodall et al. | |
| 2011/0286713 A1 | 11/2011 | Mori et al. | |
| 2012/0259053 A1 | 10/2012 | Kamei | |
| 2016/0002490 A1* | 1/2016 | Endo ..................... | B32B 27/325 526/171 |

FOREIGN PATENT DOCUMENTS

| | | | |
|---|---|---|---|
| JP | 2000-309629 A | 11/2000 | |
| JP | 2001-516780 A | 10/2001 | |
| JP | 2006-323244 A | 11/2006 | |
| JP | 2008-158474 A | 7/2008 | |
| JP | 2008158474 * | 7/2008 | ............. G02B 6/122 |
| JP | 2009-255380 A | 11/2009 | |
| WO | 03/062253 A1 | 7/2003 | |
| WO | 2014/129486 A1 | 8/2014 | |
| WO | 2020/072776 A1 | 4/2020 | |

OTHER PUBLICATIONS

Nagaki—JP 2008-158474 A—ISR D6—MT—norbornene structure II polymer—silane as crosslinkable monomer—2008 (Year: 2008).*
International Preliminary Report on Patentability (Form PCT/IB/373) issued in counterpart International Application No. PCT/JP2020/029536 dated Feb. 8, 2022, with Form PCT/ISA/237. (5 pages).
International Search Report dated Oct. 13, 2020, issued in counterpart application No. PCT/JP2020/029536 (3 pages).
Extended (Supplementary)European Search Report dated Jul. 11, 2023, issued in counterpart EP Application No. 20849280.1. (10 pages).

* cited by examiner

*Primary Examiner* — Hui H Chin
(74) *Attorney, Agent, or Firm* — WHDA, LLP (57) ABSTRACT

Provided is a polymerizable composition comprising a cycloolefin-based monomer having a specific structure, a silane coupling agent having at least one hydrocarbon group having a norbornene structure, and a metathesis polymerization catalyst.

11 Claims, 1 Drawing Sheet

POLYMERIZABLE COMPOSITION, CYCLOOLEFIN-BASED POLYMER, AND METAL/RESIN COMPOSITE

TECHNICAL FIELD

The present invention relates to a polymerizable composition which maintains a low viscosity and has thixotropic properties (static viscosity) hardly increased even after compounded with a filler, and can form a cycloolefin-based polymer highly adhesive to a metal, a cycloolefin-based polymer prepared by polymerization of the polymerizable composition, and a metal/resin composite comprising the cycloolefin-based polymer adhering to the metal.

BACKGROUND ART

Cycloolefin-based resins are broadly used in fields of optical parts, electronic devices, medical apparatuses, automobile parts, and the like because they have features such as high transparency, high heat resistance, low moisture absorbing properties, and low dielectric constant.

While the cycloolefin-based resins have such excellent features as above, generally, these have low affinity to metals, which may lead to difficulties in preparing cycloolefin-based resin molded bodies highly adhesive to metals in some cases. Thus, as a polymerizable composition which enables formation of a cycloolefin-based resin molded body highly adhesive to metals, Patent Document 1 discloses a polymerizable composition comprising a specific cycloolefin-based monomer and a polymerization catalyst.

RELATED ART

Patent Documents

Patent Document 1: International Publication No. 2014/129486

SUMMARY OF THE INVENTION

Problem to be Solved by the Invention

However, the present inventor, who has conducted research, has revealed that compounding of a filler with the polymerizable composition according to Patent Document 1 is likely to increase the viscosity, and may reduce the adhesion of the resulting cycloolefin-based polymer to a metal in some cases.

Accordingly, an object of the present invention is to provide a polymerizable composition which maintains a low viscosity and has thixotropic properties (static viscosity) hardly increased after compounded with a filler, and can form a cycloolefin-based polymer highly adhesive to a metal.

Means for Solving Problems

The present inventor has found that combined use of a predetermined cycloolefin-based monomer described later and a predetermined silane coupling agent described later as components contained in a polymerizable composition suppresses an increase in viscosity of the polymerizable composition after compounded with a filler, and also ensures increased adhesion of the resulting cycloolefin-based polymer with a metal, and has completed the present invention.

In other words, the present invention provides a polymerizable composition comprising at least one of a cycloolefin-based monomer ($\alpha$) represented by General Formula (I) and a cycloolefin-based monomer ($\beta$) represented by General Formula (II), a silane coupling agent having at least one hydrocarbon group having a norbornene structure, and a metathesis polymerization catalyst.

(I)

where $R^1$ represents a substituent selected from the group consisting of $C_1$ to $C_{10}$ hydrocarbon groups, halogen atoms, and $C_1$ to $C_{10}$ hydrocarbon groups substituted by a halogen atom; m represents an integer of 0 or more and 6n+6 or less; when m is 1 or more, $R^1$ can be bonded to any bonding position; when m is 2 or more, $R^1$s may be the same or different; and n represents an integer of 1 to 3;

(II)

where h represents an integer of 1 to 3, i and j each independently represent an integer of 0 to 4, and k represents an integer of 1 to 4.

Preferably, the polymerizable composition according to the present invention further comprises an (meth)acrylate monomer.

Preferably, in the polymerizable composition according to the present invention, wherein at least one of the cycloolefin-based monomer ($\alpha$) and the cycloolefin-based monomer ($\beta$) and the (meth)acrylate monomer are contained in a mass ratio (cycloolefin-based monomer(s)/(meth)acrylate monomer) of 20/80 to 80/20.

In the polymerizable composition according to the present invention, the silane coupling agent preferably comprises a compound represented by General Formula (III):

(III)

where $R^2$ and $R^3$ are any groups which may be the same or different, X is a hydrocarbon group having a norbornene structure, g and f are an integer of 0 to 3, p is an integer of 1 to 4, and g+f+p=4.

Preferably, the polymerizable composition according to the present invention is composed of two or more preparative blend solutions each of which alone is not capable of polymerization, and can be formed by combining the preparative blend solutions.

The present invention also provides a filler-containing polymerizable composition comprising the polymerizable composition and a filler.

Preferably, in the filler-containing polymerizable composition according to the present invention, the filler is an inorganic filler.

The present invention also provides a cycloolefin-based polymer prepared by polymerizing the polymerizable composition or the filler-containing polymerizable composition.

The present invention also provides a metal/resin composite comprising the cycloolefin-based polymer and a metal adhering to at least part of a surface of the cycloolefin-based polymer.

Effects of Invention

The present invention can provide a polymerizable composition which maintains a low viscosity and has thixotropic properties (static viscosity) hardly increased after compounded with a filler, and can form a cycloolefin-based polymer highly adhesive to a metal.

DESCRIPTION OF EMBODIMENTS

The polymerizable composition according to the present invention comprises at least one of a cycloolefin-based monomer (α) represented by General Formula (I) and a cycloolefin-based monomer (β) represented by General Formula (II), a silane coupling agent having at least one hydrocarbon group having a norbornene structure, and a metathesis polymerization catalyst.

In this specification, unless otherwise specified, the term "polymerizable composition" indicates a polymerizable composition without a filler, and the term "filler-containing polymerizable composition" indicates a polymerizable composition containing a filler.

[Cycloolefin-Based Monomer (α)]

In the present invention, the cycloolefin-based monomer (α) used as a monomer component is a compound having an alicyclic structure famed by carbon atoms in the molecule, the alicyclic structure having a polymerizable carbon-carbon double bond and an epoxy group. The cycloolefin-based monomer (α) contributes to demonstration of adhesion to a metal in the resulting cycloolefin-based polymer.

In General Formula (I), $R^1$ represents a substituent selected from the group consisting of $C_1$ to $C_{10}$ hydrocarbon groups (preferably, $C_1$ to $C_5$ hydrocarbon groups), halogen atoms, and $C_1$ to $C_{10}$ hydrocarbon groups substituted by a halogen atom (preferably, $C_1$ to $C_5$ hydrocarbon groups substituted by a halogen atom).

Examples of the $C_1$ to $C_{10}$ hydrocarbon groups for $R^1$ include $C_1$ to $C_{10}$ alkyl groups such as a methyl group, an ethyl group, and a propyl group; $C_2$ to $C_n$ alkenyl groups such as a vinyl group, a propenyl group, and a crotyl group; $C_2$ to $C_{10}$ alkynyl groups such as an ethynyl group, a propargyl group, and a 3-butynyl group; $C_6$ to $C_{10}$ aryl groups such as a phenyl group, a 1-naphthyl group, and a 2-naphthyl group; $C_3$ to $C_{10}$ cycloalkyl groups such as a cyclopropyl group, a cyclopentyl group, and a cyclohexyl group; and the like.

Examples of the halogen atoms for $R^1$ include fluorine, chlorine, bromine atoms, and the like.

Examples of the $C_1$ to $C_{10}$ hydrocarbon groups substituted by a halogen atom for $R^1$ include a chloromethyl group, a 2-chloroethyl group, a trifluoromethyl group, a pentafluoroethyl group, and the like.

m is an integer of 0 or more and 6n+6 or less, preferably 0 or more and 4 or less. When m is 1 or more, $R^1$ can be bonded to any bonding position. When m is 2 or more, a plurality of R's may be the same or different. n represents an integer of 1 to 3, preferably 1 or 2, more preferably 1.

Examples of the cycloolefin-based monomer (α) include compounds represented by General Formula (I) where n is 1, such as 4,5-epoxytricyclo[5.2.1.0$^{2,6}$]deca-8-ene, 4,5-epoxy-8-chlorotricyclo[5.2.1.0$^{2,6}$]deca-8-ene, 4,5-epoxy-8-methyltricyclo[5.2.1.0$^{2,6}$]deca-8-ene, and 4,5-epoxy-8-trifluoromethyltricyclo[5.2.1.0$^{2,6}$]deca-8-ene;

compounds represented by General Formula (I) where n is 2, such as 10,11-epoxypentacyclo[7.4.0.1$^{2,5}$.1$^{7,13}$.0$^{8,12}$]pentadeca-3-ene and 10,11-epoxy-4-chloropentacyclo[7.4.0.1$^{2,5}$.1$^{7,13}$.0$^{8,12}$]pentadeca-3-ene; and compounds represented by General Formula (I) where n is 3, such as 14,15-epoxyheptacyclo[8.7.0.1$^{2,9}$.0$^{3,8}$.1$^{4,7}$.1$^{11,17}$.0$^{12,16}$]eicosa-6-ene and 14,15-epoxy-5-chloroheptacyclo[8.7.0.1$^{2,9}$0$^{3,8}$.1$^{4,7}$.1$^{11,17}$.0$^{12,16}$]eicosa-5-ene.

Among these, preferred are compounds where n is 1, and more preferred is 4,5-epoxytricyclo[5.2.1.0$^{2,6}$]deca-8-ene (also referred to as dicyclopentadiene monoepoxide (2,3-DCPME), and simply referred to as DCPME in some cases in this specification).

The content of the cycloolefin-based monomer (α) in the polymerizable composition according to the present invention is preferably 0.1 to 20% by mass, more preferably 0.5 to 10% by mass, still more preferably 1 to 5% by mass.

The cycloolefin-based monomer (α) to be used may be accompanied by by-products generated secondarily during synthesis thereof. For example, if the cycloolefin-based monomer (α) is DCPME, 5,6-DCPME and DCPDE (dicyclopentadiene diepoxide) may be generated as by-products. The content of the by-products in the polymerizable composition according to the present invention is usually less than 1% by mass.

[Cycloolefin-Based Monomer (β)]

In the present invention, the cycloolefin-based monomer (β) represented by General Formula (II) is a compound having an alicyclic structure formed by carbon atoms and an epoxy group-containing group bonded to the alicyclic structure in the molecule, the alicyclic structure having a polymerizable carbon-carbon double bond. Similarly to the cycloolefin-based monomer (α), the cycloolefin-based monomer (β) contributes to demonstration of adhesion to a metal in the resulting cycloolefin-based polymer.

In General Formula (II), h represents an integer of 1 to 3, i and j each independently represent an integer of 0 to 4, and k represents an integer of 1 to 4. Preferably, i and j each are 0 or 1, and k is 2 to 4. More preferably, i is 0, j is 0 or 1, and k is 2.

The cycloolefin-based monomer (β) represented by General Formula (II) is available as a commercial product such as Adeka resin EP-4088S or EP-4088L (both available from ADEKA Corporation).

The content of the cycloolefin-based monomer (β) in the polymerizable composition according to the present invention is preferably 0.1 to 20% by mass, more preferably 0.5 to 10% by mass, still more preferably 1 to 5% by mass.

[Another Cycloolefin-Based Monomer]

As a monomer component, the polymerizable composition according to the present invention preferably contains another cycloolefin-based monomer (hereinafter, referred to as "cycloolefin-based monomer (γ)" in some cases) which is copolymerizable with the cycloolefin-based monomer (α) and the cycloolefin-based monomer (β), and has an alicyclic structure formed by carbon atoms in the molecule, the alicyclic structure having a polymerizable carbon-carbon double bond.

The cycloolefin-based monomer (γ) is a cycloolefin-based monomer different from and copolymerizable with the cycloolefin-based monomer (α) and the cycloolefin-based monomer (β), and is not particularly limited. Examples thereof include norbornene-based monomers, monocyclic cycloolefins, and the like.

The norbornene-based monomers are compounds having a norbornene structure (norbornene skeleton), and examples thereof include, but should not be limited to, bicyclic compounds such as norbornene and norbonadiene; tricyclic compounds such as dicyclopentadiene (cyclopentadiene dimer) and dihydrodicyclopentadiene; tetracyclic compounds such as tetracyclododecene; pentacyclic compounds such as cyclopentadiene trimers; heptacyclic compounds such as cyclopentadiene tetramers; and the like.

These norbornene-based monomers may have a substituent such as an alkyl group such as a methyl group, an ethyl group, a propyl group, or a butyl group; an alkenyl group such as a vinyl group; an alkenylidene group such as an ethylidene group; an aryl group such as a phenyl group, a tolyl group, or a naphthyl group; or the like. Furthermore, these norbornene-based monomers may have a polar group such as a carboxy group, an alkoxycarbonyl group, an acyloxy group, an oxy group, a cyano group, or a halogen atom.

Specific examples of such norbornene-based monomers include dicyclopentadiene, tricyclopentadiene, cyclopentadiene-methylcyclopentadiene codimer, 5-ethylidenenorbornene, norbornene, norbonadiene, 5-cyclohexenylnorbornene, 1,4,5,8-dimethano-1,4,4a,5,6,7,8,8a-octahydronaphthalene, 1,4-methano-1,4,4a,5,6,7,8,8a-octahydronaphthalene, 6-ethylidene-1,4,5,8-dimethano-1,4,4a,5,6,7,8,8a-octahydronaphthalene, 6-ethylidene-1,4-methano-1,4,4a,5,6,7,8,8a-octahydronaphthalene, 1,4,5,8-dimethano-1,4,4a,5,6,7,8,8a-hexahydronaphthalene, ethylenebis(5-norbornene), and the like.

These norbornene-based monomers may be used alone or in combination.

Among these norbornene-based monomers, preferred are those having a freezing point of 20° C. or more, more preferred are those having a freezing point of 28° C. or more, and still more preferred are those having a freezing point of 35° C. or more because their handling at room temperature is easy. Among these, preferred are dicyclopentadiene (freezing point: 31° C.) and tricyclopentadiene (freezing point: 68° C.), and particularly preferred is dicyclopentadiene because these are readily available, have high reactivity, and ensure high heat resistance of the resulting cycloolefin-based polymer.

Examples of the monocyclic cycloolefins include those such as cyclobutene, cyclopentene, cyclopentadiene, cyclooctene, cyclododecene, and the like.

The content of the cycloolefin-based monomer (γ) in the polymerizable composition according to the present invention is preferably 70% by mass or more, more preferably 80% by mass or more, still more preferably 90% by mass or more. The upper limit is about 98% by mass.

[Silane Coupling Agent]

The silane coupling agent used in the present invention has at least one hydrocarbon group having a norbornene structure (norbornene skeleton). The polymerizable composition according to the present invention containing such a silane coupling agent maintains a low viscosity and has thixotropic properties (static viscosity) hardly increased after compounded with a filler, and can form a cycloolefin-based polymer highly adhesive to a metal.

The silane coupling agent having at least one hydrocarbon group having a norbornene structure is preferably a compound represented by General Formula (III):

$$R^2{}_g X_p SiR^3{}_f \qquad (III)$$

In General Formula (III), $R^2$ and $R^3$ are any groups which may be the same or different. Specific examples of the groups include a hydrogen atom; halogen atoms such as fluorine, chlorine, and bromine atoms; $C_1$ to $C_6$ alkyl groups such as a methyl group, an ethyl group, and a propyl group; $C_1$ to $C_6$ alkoxy groups such as a methoxy group, an ethoxy group, and a propoxy group; and the like. Preferred are halogen atoms and $C_1$ to $C_6$ alkoxy groups, more preferred are a chlorine atom, a methoxy group, and an ethoxy group, and particularly preferred are a methoxy group and an ethoxy group.

In General Formula (III), X is a hydrocarbon group having a norbornene structure. The total number of carbon atoms forming the hydrocarbon group is preferably 7 to 30, more preferably 9 to 20. Examples of suitable hydrocarbon groups for X include a bicycloheptenyl group and a bicycloheptenylalkyl group. The bicycloheptenylalkyl group preferably has a $C_2$ to $C_8$ alkyl group.

In General Formula (III), g and f are an integer of 0 to 3, and p is an integer of 1 to 4. Moreover, g+f+p=4.

Specific examples of the compound represented by General Formula (III) include bicycloheptenyltrimethoxysilane, bicycloheptenyltriethoxysilane, bicycloheptenylethyltrimethoxysilane, bicycloheptenylethyltriethoxysilane, bicycloheptenylhexyltrimethoxysilane, bicycloheptenylhexyltriethoxysilane, bicycloheptenyltrichlorosilane, bicycloheptenylethyltrichlorosilane, bicycloheptenylhexyltrichlorosilane, and the like. Preferred are bicycloheptenylethyltrimethoxysilane, bicycloheptenylethyltriethoxysilane, bicycloheptenylhexyltrimethoxysilane, and bicycloheptenylhexyltriethoxysilane. More preferred are bicycloheptenylhexyltrimethoxysilane and bicycloheptenylethyltriethoxysilane, and still more preferred is bicycloheptenylethyltrimethoxysilane.

The content of the silane coupling agent having at least one hydrocarbon group having a norbornene structure in the polymerizable composition according to the present invention is preferably 0.1 to 5% by mass, more preferably 0.3 to 2% by mass, still more preferably 0.5 to 1% by mass.

The polymerizable composition according to the present invention may contain a silane coupling agent without a hydrocarbon group having a norbornene structure. Examples of such a silane coupling agent include vinyltrimethoxysilane, allyltrimethoxysilane, hexyltrimethoxysilane, acrylopropyltrimethoxysilane, parastyryltrimethoxysilane, and the like.

The polymerizable composition according to the present invention may also contain a coupling agent other than silane coupling agents. Examples of the coupling agent other than silane coupling agents include thiol coupling agents, aluminate coupling agents, titanate coupling agents, fatty acid esters, and the like.

The content of the coupling agent(s) other than the silane coupling agent having at least one hydrocarbon group having a norbornene structure in the polymerizable composition according to the present invention is usually less than 5% by mass.

[Metathesis Polymerization Catalyst]

The metathesis polymerization catalyst used in the present invention is a complex containing a transition metal atom as a central atom to which a plurality of ions, atoms, polyatomic ions, and/or compounds are bonded. As the transition metal atom, atoms of Groups 5, 6 and 8 (Long Periodic Table, hereinafter the same is applied) are used. Although there is no particular limitation to the atoms of the respective groups, examples of atoms of Group 5 include tantalum, examples of those of Group 6 include molybdenum and tungsten, and examples of those of Group 8 include ruthenium and osmium. Among these transition metal atoms, preferred are ruthenium and osmium of Group 8. That is, the metathesis polymerization catalyst used in the present invention is preferably a complex having ruthenium or osmium as the central atom, more preferably a complex having ruthenium as the central atom. The complex having ruthenium as the central atom is preferably a ruthenium carbene complex in which a carbene compound is coordinated with ruthenium. Here, the "carbene compound" is a generic name for a compound having a methylene free radical, and refers to a compound having an uncharged divalent carbon atom (carbene carbon) represented by (>C:). Because the ruthenium carbene complex has high catalytic activity during ring-opening polymerization, a high-quality cycloolefin-based polymer having a low odor derived from unreacted monomers is prepared with high productivity. The ruthenium carbene complex, which is relatively stable to oxygen or moisture in the air and is hardly deactivated, can be also used under the air. These metathesis polymerization catalysts may be used alone or in combination.

Examples of the ruthenium carbene complex include those represented by General Formula (1) or (2).

In General Formulae (1) and (2) above, $R^4$ and $R^5$ each independently are a hydrogen atom; a halogen atom; or a $C_1$ to $C_{20}$ organic group which may contain a halogen atom, an oxygen atom, a nitrogen atom, a sulfur atom, a phosphorus atom, or a silicon atom; and these groups may be substituted or not substituted, or may be bonded to each other to foil a ring. Examples of $R^4$ and $R^5$ bonded to form a ring include optionally substituted indenylidene groups, such a phenyl-indenylidene group, and the like.

Specific examples of the $C_1$ to $C_{20}$ organic group which may contain a halogen atom, an oxygen atom, a nitrogen atom, a sulfur atom, a phosphorus atom, or a silicon atom include $C_1$ to $C_{20}$ alkyl groups, $C_2$ to $C_{20}$ alkenyl groups, $C_2$ to $C_{20}$ alkynyl groups, $C_6$ to $C_{20}$ aryl groups, $C_1$ to $C_{20}$ alkoxy groups, $C_2$ to $C_{20}$ alkenyloxy groups, $C_2$ to $C_{20}$ alkynyloxy groups, $C_6$ to $C_{20}$ aryloxy groups, $C_1$ to $C_8$ alkylthio groups, a carbonyloxy group, $C_1$ to $C_{20}$ alkoxycarbonyl groups, $C_1$ to $C_{20}$ alkylsulfonyl groups, $C_1$ to $C_{20}$ alkylsulfinyl groups, $C_1$ to $C_{20}$ alkylsulfonic acid groups, $C_6$ to $C_{20}$ arylsulfonic acid groups, phosphonic acid groups, $C_6$ to $C_{20}$ arylphosphonic acid groups, $C_1$ to $C_{20}$ alkylammonium groups, $C_6$ to $C_{20}$ arylammonium groups, and the like. These $C_1$ to $C_{20}$ organic groups which may contain a halogen atom, an oxygen atom, a nitrogen atom, a sulfur atom, a phosphorus atom, or a silicon atom may be substituted or not substituted. Examples of the substituent include $C_1$ to $C_{10}$ alkyl groups, $C_1$ to $C_{10}$ alkoxy groups, $C_6$ to $C_{10}$ aryl groups, and the like.

$X^1$ and $X^2$ each independently represent any anionic ligand. The anionic ligand is a ligand having a negative charge when separated from a central metal atom, and examples thereof include halogen atoms, a diketonate group, a substituted cyclopentadienyl group, an alkoxyl group, an aryloxy group, a carboxyl group, and the like.

$L^1$ and $L^2$ represent a heteroatom-containing carbene compound or a neutral electron-donating compound other than heteroatom-containing carbene compounds. The heteroatom-containing carbene compound and the neutral electron-donating compound other than heteroatom-containing carbene compounds are compounds having a neutral charge when separated from a central metal atom. To improve catalytic activity, the heteroatom-containing carbene compound is preferred. The heteroatom indicates atoms of Groups 15 and 16 in the Periodic Table, and specifically, examples thereof include a nitrogen atom, an oxygen atom, a phosphorus atom, a sulfur atom, an arsenic atom, a selenium atom, and the like. Among these, preferred are a nitrogen atom, an oxygen atom, a phosphorus atom, and a sulfur atom, and particularly preferred is a nitrogen atom to prepare a stable carbene compound.

As the heteroatom-containing carbene compound, a compound represented by General Formula (3) or (4) is preferred, and from the viewpoint of improved catalytic activity, a compound represented by General Formula (3) is particularly preferred.

In General Formulae (3) and (4) above, $R^6$, $R^7$, $R^8$, and $R^9$ each independently represent a hydrogen atom; a halogen atom; or a $C_1$ to $C_{20}$ organic group which may contain a halogen atom, an oxygen atom, a nitrogen atom, a sulfur atom, a phosphorus atom, or a silicon atom. Specific examples of the $C_1$ to $C_{20}$ organic group which may contain a halogen atom, an oxygen atom, a nitrogen atom, a sulfur atom, a phosphorus atom, or a silicon atom are the same as those in General Formulae (1) and (2) above.

$R^6$, $R^7$, $R^8$, and $R^9$ may be bonded to each other in any combination to form a ring.

Since the effect of the present invention becomes more prominent, $R^8$ and $R^9$ are preferably a hydrogen atom. $R^6$ and $R^7$ are preferably an aryl group which may be substituted or not substituted, more preferably a phenyl group having a $C_1$ to $C_{10}$ alkyl group as a substituent, and particularly preferably a mesityl group.

Examples of the neutral electron-donating compound include an oxygen atom, water, carbonyls, ethers, nitriles, esters, phosphines, phosphinites, phosphites, sulfoxides, thioethers, amides, imines, aromatics, cyclic diolefins, olefins, isocyanides, thiocyanates, and the like.

In General Formulae (1) and (2) above, $R^4$, $R^5$, and $L^2$ may stand alone and/or be bonded to each other in any combination to form a multidentate chelating ligand.

Among these compounds represented by General Formula (1) or (2) above, the ruthenium carbene complex used in the present invention is preferably a compound represented by General Formula (1) above. Among these, more preferred is a compound represented by General Formula (5) or (6) below.

General Formula (5) is shown below.

(5)

In General Formula (5), Z is an oxygen atom, a sulfur atom, a selenium atom, $NR^{15}$, $PR^{15}$, or $AsR^{15}$, and $R^{15}$ is a hydrogen atom; a halogen atom; or a $C_1$ to $C_{20}$ organic group which may contain a halogen atom, an oxygen atom, a nitrogen atom, a sulfur atom, a phosphorus atom, or a silicon atom. As Z, an oxygen atom is preferred because the effect of the present invention becomes more pronounced.

$R^4$, $R^5$, $X^1$, and $L^1$ are the same as those in General Formulae (1) and (2) above, and may stand alone and/or be bonded in any combination to form a multidentate chelating ligand. However, it is preferred that $X^1$ and $L^1$ do not form a multidentate chelating ligand and $R^4$ and $R^5$ be bonded to each other to form a ring, which is more preferably an indenylidene group which may be substituted or not substituted, particularly preferably a phenylindenylidene group.

Specific examples of the $C_1$ to $C_{20}$ organic group which may contain a halogen atom, an oxygen atom, a nitrogen atom, a sulfur atom, a phosphorus atom, or a silicon atom are the same as those in General Formulae (1) and (2) above.

In General Formula (5) above, $R^{10}$ and $R^{11}$ each independently are a hydrogen atom, a $C_1$ to $C_{20}$ alkyl group, a $C_2$ to $C_{20}$ alkenyl group, or a $C_6$ to $C_{20}$ heteroaryl group, and these groups may be substituted or not substituted or may be bonded to each other to form a ring. Examples of the substituent include $C_1$ to $C_{10}$ alkyl groups, $C_1$ to $C_{10}$ alkoxy groups, or $C_6$ to $C_{10}$ aryl group. Although the ring in the case where $R^{10}$ and $R^{11}$ form a ring may be any of an aromatic ring, an alicyclic ring, and a heterocyclic ring, $R^{10}$ and $R^{11}$ form preferably an aromatic ring, more preferably a $C_6$ to $C_{20}$ aromatic ring, particularly preferably a $C_6$ to $C_{10}$ aromatic ring.

In General Formula (5) above, $R^{12}$, $R^{13}$, and $R^{14}$ each independently are a hydrogen atom; a halogen atom; or a $C_1$ to $C_{20}$ organic group which may contain a halogen atom, an oxygen atom, a nitrogen atom, a sulfur atom, a phosphorus atom, or a silicon atom; and these groups may be substituted or not substituted or may be bonded to each other to form a ring. Specific examples of the $C_1$ to $C_{20}$ organic group which may contain a halogen atom, an oxygen atom, a nitrogen atom, a sulfur atom, a phosphorus atom, or a silicon atom are the same as those in General Formulae (1) and (2) above.

$R^{12}$, $R^{13}$, and $R^{14}$ are preferably a hydrogen atom or a $C_1$ to $C_{20}$ alkyl group, particularly preferably a hydrogen atom or a $C_1$ to $C_3$ alkyl group.

Specific examples of the compound represented by General Formula (5) above and a method for producing the same include those described in International Publication No. 03/062253 (JP-A-2005-515260).

General Formula (6) is shown below.

(6)

In General Formula (6) above, m is 0 or 1. m is preferably 1, where Q is an oxygen atom, a nitrogen atom, a sulfur atom, a methylene group, an ethylene group, or a carbonyl group, and is preferably a methylene group.

In General Formula (6),

═══ is a single bond or a double bond, preferably a single bond.

$R^4$, $X_1$, $X^2$ and $L^1$ are the same as in General Formulae (1) and (2) above, and may stand alone and/or may be bonded to each other in any combination to form a multidentate chelating ligand. However, it is preferred that $X^1$, $X^2$, and $L^1$ do not form a multidentate chelating ligand and $R^4$ be a hydrogen atom.

$R^{16}$ to $R^{24}$ each independently are a hydrogen atom; a halogen atom; or a $C_1$ to $C_{20}$ organic group which may contain a halogen atom, an oxygen atom, a nitrogen atom, a sulfur atom, a phosphorus atom, or a silicon atom; and these groups may be substituted or not substituted or may be bonded to each other to fauna ring. Specific examples of the $C_1$ to $C_{20}$ organic group which may contain a halogen atom, an oxygen atom, a nitrogen atom, a sulfur atom, a phosphorus atom, or a silicon atom are the same as those in General Formulae (1) and (2) above.

$R^{16}$ is preferably a $C_1$ to $C_{20}$ alkyl group, more preferably a $C_1$ to $C_3$ alkyl group, $R^{17}$ to $R^{20}$ are preferably a hydrogen atom, and $R^{21}$ to $R^{24}$ are preferably a hydrogen atom or a halogen atom.

Specific examples of the compound represented by General Formula (6) above and a method for producing the same include those described in International Publication No. 11/079799 (JP-A-2013-516392).

As the compound represented by General Formula (1) above, a compound (7) below can also be suitably used as well as those compounds represented by General Formula (5) or (6) above. In the compound (7), PCy₃ represents tricyclohexylphosphine, and Mes represents a mesityl group.

(7)

The content of the metathesis polymerization catalyst is preferably 0.005 mmol or more, more preferably 0.01 to 50 mmol, still more preferably 0.015 to 20 mmol relative to 1 mol of the monomer components in the polymerizable composition.

[(Meth)Acrylate Monomer]

The polymerizable composition according to the present invention may further contain an (meth)acrylate monomer as a monomer component in addition to the cycloolefin-based monomer (α) and the cycloolefin-based monomer (β). The polymerizable composition according to the present invention further containing an (meth)acrylate monomer can ensure formation of a cycloolefin-based polymer more highly adhesive to a metal.

The (meth)acrylate monomer may be a polyfunctional monomer having three or more (meth)acryloyl groups, and is suitably a monofunctional monomer having one (meth)acryloyl group or a bifunctional monomer having two (meth)acryloyl groups. More suitable is a monofunctional monomer. The (meth)acrylate monomer is suitably a methacrylate monomer.

The (meth)acrylate monomer preferably has a hydrocarbon group having 6 carbon atoms or more because such an (meth)acrylate monomer demonstrates a high effect. The hydrocarbon group has preferably 6 to 100, more preferably 8 to 50, still more preferably 10 to 20 carbon atoms.

Specific examples of the monofunctional monomer having one (meth)acryloyl group include benzyl methacrylate, hexyl methacrylate, phenyl methacrylate, phenoxyethyl methacrylate, octenyl methacrylate, tolyl methacrylate, cyclohexyl methacrylate, adamantyl methacrylate, lauryl methacrylate, stearyl methacrylate, tetrahydrofurfuryl methacrylate, methoxy diethylene glycol methacrylate, dicyclopentenyloxy ethyl methacrylate, dicyclopentanyl methacrylate, and the like Specific examples of the bifunctional monomer having two (meth)acryloyl groups include ethylene dimethacrylate, 1,3-butylene dimethacrylate, 1,4-butylene dimethacrylate, 1,6-hexanediol dimethacrylate, polyethylene glycol dimethacrylate, polyethylene glycol dimethacrylate, ethylene glycol dimethacrylate, triethylene glycol dimethacrylate, diethylene glycol dimethacrylate, bisphenol dimethacrylate, tricyclodecane dimethanol dimethacrylate, 1,3-adamantyldimethanol dimethacrylate, 1,4-adamantyldimethanol dimethacrylate, 2,2'-bis(4-methacryloxydiethoxyphenyl)propane, and the like.

Specific examples of polyfunctional monomers having three or more (meth)acryloyl groups include trimethylolpropane trimethacrylate, pentaerythritol trimethacrylate, and the like.

These monofunctional monomers having one (meth)acryloyl group, bifunctional monomers having two (meth)acryloyl groups, and polyfunctional monomers having three or more (meth)acryloyl groups may be used in any combination in any proportion.

In the polymerizable composition according to the present invention, at least one of the cycloolefin-based monomer (α) and the cycloolefin-based monomer (β) and the (meth)acrylate monomer are contained in a mass ratio (cycloolefin-based monomer(s)/(meth)acrylate monomer) of preferably 20/80 to 80/20, more preferably 50/50 to 80/20.

[Other Components]

The polymerizable composition according to the present invention may contain other components than the components described above, and examples of such other components include an activating agent, a polymerization retardant, a radical generator, a reforming agent, an antioxidant, a colorant, a photostabilizer, and the like. The content of these other components is usually less than 5% in the polymerizable composition according to the present invention.

The activating agent is a compound which acts as a cocatalyst for the metathesis polymerization catalyst described above to improve the polymerization activity of the metathesis polymerization catalyst. Specific examples of such an activating agent include, but should not be limited to, organic aluminum compounds, such as alkylaluminum halides such as ethylaluminum dichloride and diethylaluminum chloride and alkoxyalkylaluminum halides; organic tin compounds such as tetrabutyl tin; organic zinc compounds such as diethyl zinc; chlorosilane compounds such as dimethylmonochlorosilane, dimethylcichlorosilane, diphenyldichlorosilane, tetrachlorosilane, bicycloheptenylmethyldichlorosilane, phenylmethyldichlorosilane, dihexyldichlorosilane, phenyltrichlorosilane, and methyltrichlorosilane; and the like.

The polymerization retardant suppresses initiation of polymerization during preparation of the polymerizable composition by mixing the monomer components and the metathesis polymerization catalyst. Examples of such a polymerization retardant include phosphines, phosphites, vinyl ether derivatives, ethers, esters, nitrile compounds, pyridine derivatives, alcohols, acetylenes, α-olefins, and the like.

Examples of the radical generator include known organic peroxides, diazo compounds, nonpolar radical generators, and the like. Among these, organic peroxides are preferred.

Examples of the organic peroxides include hydroperoxides such as t-butyl hydroperoxide and cumene hydroperoxide; dialkyl peroxides such as di-t-butyl peroxide, 2,5-dimethyl-2,5-di(t-butylperoxy)-3-hexyne, and 2,5-dimethyl-2,5-di(t-butylperoxy)hexane; and the like. Preferred are dialkyl peroxides because these hardly interfere with the metathesis polymerization reaction.

The polymerizable composition according to the present invention is composed of two or more preparative blend solutions each of which alone is not capable of polymerization, and can be formed by combining the preparative blend solutions. In other words, the present invention also relates to a combination of two or more preparative blend solutions for forming the polymerizable composition, wherein the preparative blend solutions have such compositions that each of the preparative blend solutions alone is not capable of polymerization and the preparative blend solutions are mixed to form the polymerizable composition.

The two or more preparative blend solutions can be prepared by selecting the above components such that each of the preparative blend solutions alone is not capable of polymerization and mixing thereof results in formation of the polymerizable composition above.

The two or more preparative blend solutions are preferably prepared by either of the following two processes depending on whether the metathesis polymerization catalyst to be used needs the activating agent (cocatalyst) or not.

If the metathesis polymerization catalyst to be used does not need the activating agent, a two-solution type polymerizable composition comprising a preparative blend solution (i) containing the monomer component(s) and a preparative blend solution (ii) containing the metathesis polymerization catalyst is preferably prepared. The preparative blend solution (ii) can be prepared by dissolving or dispersing the metathesis polymerization catalyst in a small amount of an appropriate solvent, for example. Examples of the solvent include aromatic hydrocarbons such as toluene, xylene, ethylbenzene, and trimethylbenzene; ketones such as methyl ethyl ketone, cyclopentanone, cyclohexanone, 2-heptanone, and 4-hydroxy-4-methyl-2-pentanone; and the like.

If the metathesis polymerization catalyst needs the activating agent, a two-solution type polymerizable composition comprising a preparative blend solution containing the monomer component(s) and the metathesis polymerization catalyst (hereinafter, referred to as "solution A" in some cases) and a preparative blend solution containing the monomer component(s) and the activating agent (hereinafter, referred to as "solution B" in some cases) is preferably prepared. In this case, a three-solution type polymerizable composition comprising the solution A, the solution B, and a preparative blend solution containing only the monomer component(s) (hereinafter, referred to as "solution C" in some cases) may be prepared.

The components other than the metathesis polymerization catalyst, the activating agent, and the monomer component(s) can be contained in any of the preparative blend solutions.

[Filler]

The polymerizable composition according to the present invention can be compounded with a filler before use. Compounding of the filler hardly increases the viscosity and the thixotropic properties (static viscosity) of the polymerizable composition according to the present invention, and thus, a large amount of the filler can be compounded. The filler-containing polymerizable composition according to the present invention prepared by compounding the polymerizable composition according to the present invention with the filler can form a cycloolefin-based polymer highly adhesive to a metal as in the polymerizable composition according to the present invention.

The filler may be any one of an inorganic filler and an organic filler, and an inorganic filler is preferred. A combination of an inorganic filler and an organic filler may be used.

Examples of the inorganic filler include particulate fillers having an aspect ratio of 1 to 2. Specific examples of the inorganic filler include calcium carbonate, calcium hydroxide, calcium silicate, calcium sulfate, aluminum hydroxide, magnesium hydroxide, titanium oxide, zinc oxide, barium titanate, silica, alumina, carbon black, graphite, fullerene, antimony oxide, red phosphorus, a variety of metal powders, clay, a variety of types of ferrite, hydrotalcite, and the like. Among these, preferred are silica, alumina, and aluminum hydroxide because these do not inhibit ring-opening polymerization.

Examples of the organic filler include fibrous fillers having an aspect ratio of 5 or more. Specific examples of the organic filler include glass fibers, carbon fibers, wollastonite, potassium titanate, Zonolite, basic magnesium sulfate, aluminum borate, tetrapod-shaped zinc oxide, gypsum fibers, phosphate fibers, alumina fibers, needle-like calcium carbonates, needle-like boehmite, and the like. The glass fibers to be suitably used are fibers such as E-glass, NE-glass, S-glass, D-glass, and H-glass.

The filler may be the one included in both of the inorganic filler and the organic filler, such as a bromine-based flame retardant.

The filler may have a hydrophobized surface. Use of the hydrophobized filler can prevent aggregation and sedimentation of the filler in the filler-containing polymerizable composition, and the filler can be uniformly dispersed in the resulting cycloolefin-based polymer product. Examples of a treatment agent used in the hydrophobization treatment include silane coupling agents such as vinyltrimethoxysilane, titanate coupling agents, aluminate coupling agents, fatty acids such as stearic acid, oils and fats, surfactants, waxes, and the like. The filler can be hydrophobized by simultaneously mixing the treatment agent and the filler during preparation of the filler-containing polymerizable composition.

The compounding amount of the filler in the filler-containing polymerizable composition is preferably 10 to 1000 parts by mass, more preferably 100 to 500 parts by mass relative to 100 parts by mass of the polymerizable composition according to the present invention. By controlling the compounding amount of the filler within this range, the resulting cycloolefin-based polymer can have enhanced strength.

[Method of Preparing Polymerizable Composition]

The polymerizable composition according to the present invention can be prepared by mixing the components above. The mixing can be performed according to a normal method. The polymerizable composition according to the present invention can be prepared, for example, by dissolving or dispersing the metathesis polymerization catalyst and the polymerization reaction retardant and the like as needed in an appropriate solvent to prepare a solution (catalyst solution), separately preparing a blend solution (monomer solution) of the cycloolefin-based monomer ($\alpha$) and/or the cycloolefin-based monomer ($\beta$) and other components, and adding the catalyst solution to the monomer solution, followed by stirring.

The solvent used in preparation of the catalyst solution and the monomer solution can be any solvent. Examples thereof include chain aliphatic hydrocarbons such as n-pentane, n-hexane, n-heptane, liquid paraffin, and mineral spirits; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, dicycloheptane, tricyclodecane, hexahydroindene, and cyclooctane; aromatic hydrocarbons such as benzene, toluene, and xylene; hydrocarbons having an alicyclic ring and an aromatic ring such as indene and tetrahydronaphthalene; nitrogen-containing hydrocarbons such as nitromethane, nitrobenzene, and acetonitrile; oxygen-containing hydrocarbons such as diethyl ether and tetrahydrofuran; aromatic hydrocarbons such as toluene, xylene, ethylbenzene, and trimethylbenzene; ketones such as methyl ethyl ketone, cyclopentanone, cyclohexanone, 2-heptanone, 4-hydroxy-4-methyl-2-pentanone; and the like.

The polymerizable composition according to the present invention may be solidified by cooling. The term "solidified by cooling" means solidification under cooling. Such a polymerizable composition can be prepared by the two methods below.

In a first method, the polymerizable composition is prepared as follows: The monomer component(s) preliminarily prepared into a solid by cooling to the freezing point or less, the metathesis polymerization catalyst, the silane coupling agent, and other optional components added as desired are mixed with cooling under a temperature at which the monomer component(s) is(are) not substantially melted, and the resulting mixture is formed with a tableting machine or a press forming machine under cooling while pressurizing, and is solidified by cooling. The temperature when the components are mixed is preferably usually 25° C. or less although it depends on the monomer component(s) to be used.

In a second method, the polymerizable composition is prepared as follows: (A) liquid monomer component(s), the metathesis polymerization catalyst, the silane coupling agent, and other optional components added as desired are mixed under a temperature at which the resulting mixture is kept liquid, and the resulting mixture is solidified by cooling using a mold described later, for example, before ring-opening polymerization of the monomer component(s) substantially progresses. The temperature when the components are mixed is preferably usually 30 to 60° C. although it depends on the monomer component(s) to be used.

In both of the methods, the cooling temperature during solidification by cooling is preferably usually −60 to 0° C. although it depends on the monomer component(s) to be used.

By compounding the filler as the optional component, the filler-containing polymerizable composition solidified by cooling can be prepared.

[Cycloolefin-Based Polymer]

The cycloolefin-based polymer according to the present invention is prepared by polymerizing the polymerizable composition or the filler-containing polymerizable composition according to the present invention (hereinafter, collectively, simply referred to as "polymerizable composition" in some cases). Because the polymerizable composition according to the present invention contains the metathesis polymerization catalyst, the cycloolefin-based polymer can be prepared by metathesis ring-opening polymerization.

The metathesis ring-opening polymerization can be in any reaction process, and examples thereof include solution polymerization and bulk polymerization. Among these, preferred is bulk polymerization because the cycloolefin-based polymer can be efficiently prepared. Details of bulk polymerization will be described in Section "Cycloolefin-based resin molded body".

If the ring-opening polymerization reaction is caused by solution polymerization, any solvent can be used without limitation. Preferred is a hydrocarbon solvent. Examples of the hydrocarbon solvent include aromatic hydrocarbons such as benzene, toluene, and xylene; chain aliphatic hydrocarbons such as n-pentane, hexane, and heptane; alicyclic hydrocarbons such as cyclopentane, cyclohexane, and cyclooctane; and the like. Among these, preferred are aromatic hydrocarbons and alicyclic hydrocarbons, more preferred are toluene, cyclohexane, and cyclooctane, and particularly preferred are toluene and cyclohexane. These hydrocarbon solvents can be used alone or in combination.

The polymerization temperature in solution polymerization is usually −30 to 150° C., preferably −10 to 120° C., although not particularly limited. The polymerization time is usually 1 minute to 100 hours, although not particularly limited.

The cycloolefin-based polymer according to the present invention has a weight average molecular weight (Mw) of usually 5,000 to 500,000, more preferably 10,000 to 100,000 although it depends on its application. The weight average molecular weight is a value against polystyrene standards in measurement by gel permeation chromatography using tetrahydrofuran as a solvent.

The cycloolefin-based polymer according to the present invention has a glass transition temperature (Tg) of usually 120 to 200° C., preferably 140 to 180° C.

The cycloolefin-based polymer according to the present invention has epoxy groups derived from the cycloolefin-based monomer ($\alpha$) or the cycloolefin-based monomer ($\beta$), and has high affinity to a metal. The cycloolefin-based polymer according to the present invention is preferably used as a material for forming a cycloolefin-based resin molded body or a metal/resin composite described later.

[Cycloolefin-Based Resin Molded Body]

The present invention can provide a cycloolefin-based resin molded body comprising a cycloolefin-based polymer prepared by polymerizing the polymerizable composition or the filler-containing polymerizable composition according to the present invention.

Examples of a method of preparing the cycloolefin-based resin molded body include (a) a method of applying the polymerizable composition onto a support, and then bulk polymerizing the polymerizable composition, (b) a method of injecting the polymerizable composition into a mold, and then bulk polymerizing the polymerizable composition, (c) a method of impregnating a fibrous reinforcing material with the polymerizable composition, and bulk polymerizing the polymerizable composition, and the like.

Examples of the support used in the method (a) include films and plates made of resins such as poly(tetrafluoroethylene), poly(ethylene terephthalate), polypropylene, polyethylene, polycarbonate, poly(ethylene naphthalate), polyarylate, and nylon; foils and plates made of metallic materials such as iron, stainless steel, copper, aluminum, nickel, chromium, gold, and silver; and the like. Among these, use of a metal foil or a resin film is preferred.

From the viewpoint of workability and the like, the thickness of the metal foil or the resin film is usually 1 to 200 μm, preferably 1 to 150 μm, more preferably 6 to 125 μm, still more preferably 12 to 100 μm.

The metal foil preferably has a smooth surface, and its surface roughness (Rz) measured with an atomic force microscope (AFM) is usually 10 μm or less, preferably 5 μm or less, more preferably 3 μm or less.

Examples of a method of applying the polymerizable composition according to the present invention onto the support include known application methods such as spray coating, dip coating, roll coating, curtain coating, die coating, and slit coating.

The polymerizable composition applied onto the support is dried as desired, and then is bulk polymerized. Bulk polymerization may be allowed to proceed at room temperature, or may be allowed to proceed by heating the polymerizable composition to a predetermined temperature. Examples of a method of heating the polymerizable composition include, but should not be limited to, a method of heating the polymerizable composition applied onto the support placed on a heating plate, a method of heating the polymerizable composition with a press under pressure (heat pressing the polymerizable composition), a method of pressing the polymerizable composition with a heated roller, a method of heating the polymerizable composition in a heating furnace, and the like.

According to the method (a), a cycloolefin-based resin molded body with a support in the form of a film or a plate is prepared. The cycloolefin-based resin molded body has a thickness of usually 15 mm or less, preferably 5 mu or less, more preferably 0.5 mm or less, most preferably 0.1 mm or less.

In the method (b), use of the polymerizable composition composed of two or more preparative blend solutions is preferred.

Examples of the method of injecting the polymerizable composition into a cavity of a mold, and then bulk polymerizing the polymerizable composition include reaction injection molding (RIM), resin transfer molding (RTM), potting, (solid, liquid) transfer molding, compression molding, printing molding, vacuum injection, and the like. Hereinafter, RIM suitably used for a liquid polymerizable composition will be described.

In RIM, for bulk polymerization of the polymerizable composition in the mold, usually a known collision mixer is used as a reaction injection molding (RIM) apparatus. For example, the two or more preparative blend solutions [e.g., the preparative blend solution (i) and the preparative blend solution (ii), or "solution A", "solution B" and "solution C"] are separately introduced into the collision mixer, and are instantaneously mixed in the mixing head to prepare the polymerizable composition. The polymerizable composition is injected into the mold as it is, and is heated in the mold to undergo bulk polymerization. Thus, the cycloolefin-based resin molded body is prepared. The collision mixer can be replaced by a low pressure injection machine such as a dynamic mixer or a static mixer.

Although the mold is not particularly limited, usually a mold having a split structure composed of male and female parts is preferably used. The mold to be used does not always need to be an expensive metal mold having high rigidity, and a resin mold or the like can be used. Examples of the material for the metal mold include, but should not be limited to, steel, aluminum, zinc alloys, nickel, copper, chromium, and the like. The metal mold may be the one produced by any one of methods such as casting, forging, thermal spraying, and electrocasting, and may be plated.

After the end of bulk polymerization, the mold is opened to remove the product from the mold. Thus, the cycloolefin-based resin molded body can be prepared.

According to the method (b), a cycloolefin-based resin molded body in any form is prepared. Examples of the form include sheet forms, film forms, columnar forms, cylindrical forms, polygonal columnar forms, and the like.

Examples of the fibrous reinforcing material used in the method (c) include the fibers listed as examples of the filler; organic fibers such as poly(ethylene terephthalate) (PET) fibers, aramid fibers, ultra-high molecular weight polyethylene fibers, polyamide (nylon) fibers, and liquid crystal polyester fibers; inorganic fibers such as tungsten fibers, molybdenum fibers, titanium fibers, steel fibers, boron fibers, silicon carbide fibers, and silica fibers; and the like. Among these, preferred are organic fibers, and particularly preferred are aramid fibers and liquid crystal polyester fibers. These may be used alone or in combination.

Examples of the form of the fibrous reinforcing material include, but should not be limited to, mats, clothes, non-woven fabrics, and the like.

Examples of the method of impregnating the fibrous reinforcing material with the polymerizable composition include a method of applying a predetermined amount of the polymerizable composition onto the fibrous reinforcing material by a known method such as spray coating, dip coating, roll coating, curtain coating, die coating, or slit coating, overlaying a protective film thereon as desired, and pressing the workpiece from above with a roller or the like.

After the fibrous reinforcing material is impregnated with the polymerizable composition, the polymerizable composition is bulk polymerized at room temperature or by heating the impregnated product to a predetermined temperature. Thus, a desired cycloolefin-based resin molded body can be prepared.

The content of the fibrous reinforcing material in the cycloolefin-based resin molded body is in the range of usually 10 to 90% by mass, preferably 20 to 80% by mass, more preferably 30 to 70% by mass.

Examples of the method of heating the impregnated product of the fibrous reinforcing material with the polymerizable composition include a method of heating the impregnated product on a support as in the method (a), a method of preliminarily placing the fibrous reinforcing material in the mold, impregnating the fibrous reinforcing material with the polymerizable composition in the mold, and heating the resulting impregnated product as in the method (b), and the like.

According to the method (c), a cycloolefin-based resin molded body including the fibrous reinforcing material in the form of a sheet or a film is prepared. The resulting cycloolefin-based resin molded body has a thickness in the range of usually 0.001 to 10 mm, preferably 0.005 to 1 mm, more preferably 0.01 to 0.5 mm.

In all the methods (a), (b), and (c), the temperature for polymerizing the polymerizable composition is in the range of usually 10 to 250° C., preferably 10 to 200° C., more preferably 10 to 150° C. The polymerization time may be appropriately selected, and is usually 1 second to 20 minutes, preferably 10 seconds to 5 minutes. Polymerization of the polymerizable composition under such a condition results in a cycloolefin-based resin molded body with a reduced amount of unreacted monomers.

The cycloolefin-based resin molded body is prepared by polymerizing the polymerizable composition or the filler-containing polymerizable composition according to the present invention as in the cycloolefin-based polymer, and thus has high adhesion when press bonded to a metallic material. Accordingly, the cycloolefin-based resin molded body is preferably used as a material for forming the metal/resin composite.

The cycloolefin-based polymer and the cycloolefin-based resin molded body are prepared through a single polymerization reaction. To further improve the heat resistance and the adhesion to the metal, the polymerizable composition is polymerized, and then the resulting cycloolefin-based polymer or cycloolefin-based resin molded body may be further heated.

In other words, the cycloolefin-based polymer or the cycloolefin-based resin molded body can be prepared, for example, by a method comprising primarily curing the polymerizable composition, and secondarily curing the cured product, which is prepared by the primary curing, by heating.

The primary curing may be pertained at room temperature or by heating the polymerizable composition. The temperature for the primary curing is in the range of usually 10 to 100° C., preferably 10 to 80° C., more preferably 10 to 60° C. The time needed for the primary curing is usually 1 second to 60 minutes, preferably 10 seconds to 40 minutes.

The heating temperature for the secondary curing is usually more than 100° C. and less than 350° C., preferably 110 to 330° C., more preferably 120 to 310° C. The heating time for the secondary curing is usually 10 to 120 minutes, preferably 20 to 90 minutes, more preferably 30 to 60 minutes.

[Metal/Resin Composite]

The metal/resin composite according to the present invention comprises the cycloolefin-based polymer prepared by polymerizing the polymerizable composition or the filler-containing polymerizable composition according to the present invention, and a metal adhering to at least part of a surface thereof.

The metal/resin composite according to the present invention can be prepared by polymerizing the polymerizable composition according to the present invention while the polymerizable composition is in contact with the metal.

Examples of the metal include metal bases such as metal foils (Embodiment 1). As the metal bases, the same metal foils and the like listed as the support in the "method (a)" can also be used. Because the cycloolefin-based polymer according to the present invention can be suitably used as a sealing material for electronic devices, the metal may be metals to be sealed in electronic devices, such as metal lines and metal wirings (Embodiment 2).

The metal/resin composite according to Embodiment 1 can be prepared by using the metal foil or the like as the support in the method (a).

The metal/resin composite according to Embodiment 2 can be prepared in the method (b), for example, by preliminarily placing an electronic device in the mold, injecting the polymerizable composition into the mold, and heating the mold.

Alternatively, the metal/resin composite according to the present invention can be prepared by heat pressing a laminate of a sheet-shaped cycloolefin-based resin molded body, which is prepared by any one of the methods (a) to (c) and comprises the cycloolefin-based polymer, and the metal base or the metal to be sealed in the electronic device while the resin portion of the cycloolefin-based resin molded body is disposed facing the metal base or the metal to be sealed in the electronic device.

The pressure for heat pressing is usually 0.5 to 20 MPa, preferably 1 to 10 MPa. Heat pressing may be performed in vacuum or under a reduced pressure atmosphere. Heat pressing can be performed with a known press having a press frame for flat plate forming, a press molding machine for a sheet mold compound (SMC) or a bulk mold compound (BMC), or the like.

The metal/resin composite according to the present invention may include a single layer of the metal, or may include two or more layers thereof. Alternatively, the metal/resin composite according to the present invention may include a single layer of the sheet-shaped cycloolefin-based resin molded body comprising the cycloolefin-based polymer, or may include two or more layers thereof.

The thickness of the metal/resin composite according to the present invention in a sheet shape is usually 1 µm to 10 mm, although not particularly limited.

The cycloolefin-based resin molded body and the metal/resin composite prepared as above can be used in applications to automobiles such as bumpers and air deflectors, those to construction and industrial machines such as wheel loaders and power shovels, leisure applications such as golf carts and game machines, medical applications such as medical apparatuses, industrial applications such as large panels and chairs, applications to housing equipment such as shower pans and wash basins, applications to electrical insulation as an electrically insulating sealing material for electrically insulating structured bodies, and the like, for example.

The metal/resin composite according to the present invention comprises the cycloolefin-based polymer prepared by polymerizing the polymerizable composition or the filler-containing polymerizable composition according to the present invention, and a metal adhering to at least part of a surface thereof, and has high adhesion between the metal and the cycloolefin-based polymer. Because of such properties, the metal/resin composite according to the present invention is suitably used as a print substrate material for copper foils with a resin [Resin Coated Copper (RCC)] and copper clad laminates (CCLs); seal portions for electronic devices such as electronic substrates for coils, pumps, motors, molded transformers, semiconductors, power modules, capacitors, communication and electronic circuit substrates, and the like in particular.

EXAMPLES

Hereinafter, the present invention will be specifically described by way of Examples and Comparative Examples. Unless otherwise specified, "parts" is mass-based below. Tests and evaluations were performed as follows.

Example 1

(Preparation of Monomer Mixture)

An RIM monomer (available from ZEON Corporation), dicyclopentadiene monoepoxide (DCPME), and bicycloheptenylethyltrimethoxysilane were mixed to prepare a monomer mixture having a composition shown in Table 1. DCPM was used as a cyclopentanone solution containing 5,6-DCPME and DCPDE as by-products (DCPME content: about 40% by mass, by-product content: about 27% by mass) (the same is applied below). The RIM monomer contains 90 parts of dicyclopentadiene and 10 parts of tricyclopentadiene as cycloolefin-based monomers.

DCPME     Bicycloheptenylethyltrimethoxysilane (Preparation of Catalyst Solution)

0.3 parts of ruthenium catalyst (Zhan1N) represented by Formula (8) as a metathesis polymerization catalyst, 39.7 parts of 2,6-di-t-butyl-p-cresol (BHT, antioxidant), and 30 parts of triphenylphosphine were dissolved in 30 parts of cyclopentanone to prepare a catalyst solution.

(8)

where Mes represents a mesityl group.

(Preparation of Polymerizable Composition)

3.5 parts of the catalyst solution was added to 100 parts of the monomer mixture heated to 40° C., followed by mixing these to prepare a polymerizable composition.

(Measurement of Viscosity)

The polymerizable composition and silica (MLR-1114, available from Tatsumori Ltd.) as a filler were mixed to prepare a filler-containing polymerizable composition containing 15.0% by mass of the polymerizable composition and 85.0% by mass of silica. The viscosity of the filler-containing polymerizable composition was determined by measurement with a B-type viscometer while the composition was stirred at a solution temperature of 30° C. for 1 minute using a #23 rotor at the number of rotations of 100 rpm or 10 rpm. The ratio of the viscosity at the number of rotations of 10 rpm to that of the number of rotations of 100 rpm was calculated. From the ratio, the thixotropic properties can be calculated. The result is shown in Table 1.

(Measurement of Adhesive Strength)

Figure 1A:
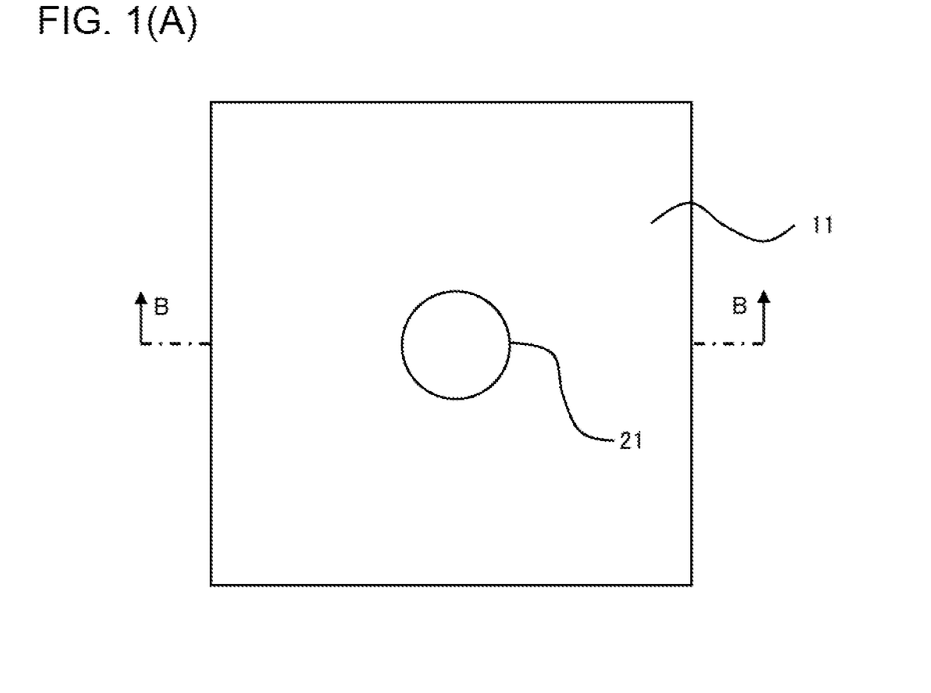
FIG. 1(A) is a plan view of a mold used in preparation of a test sample for measuring adhesive strength.
Figure 1B:
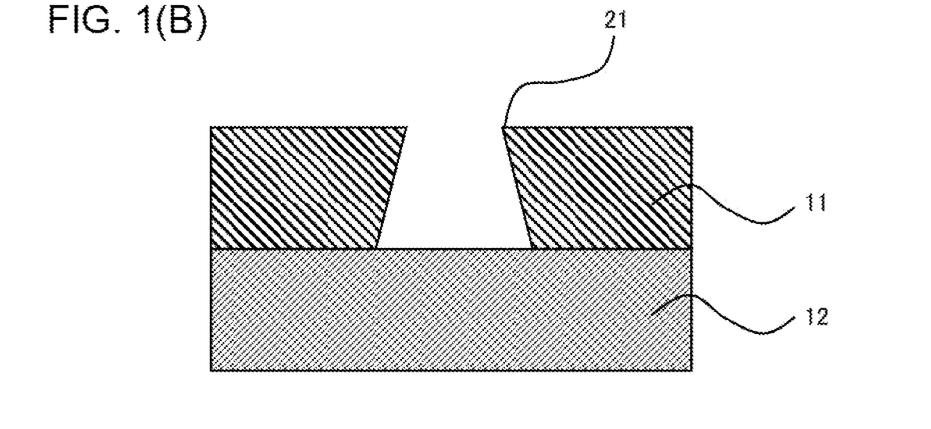
FIG. 1(B) is a cross-sectional view of FIG. 1(A) taken along line B-B.

As shown in FIG. 1, a Teflon (registered trademark) plate 11 having a hole 21 in the form of a truncated cone was placed onto a nickel base 12, and a mold having a cavity in the form of a truncated cone (bottom surface diameter: 3.53 mm, top surface diameter: 3.00 mm, height: 3.00 mm). The filler-containing polymerizable composition was injected into the cavity in the form of a truncated cone at room temperature, and was spontaneously cured (primary curing). After the primary curing, the filler-containing polymerizable composition was further cured by heating at 150° C. for 1 hour (secondary curing). After the secondary curing, the Teflon (registered trademark) plate was removed to give a test sample of the cycloolefin-based polymer formed from the filler-containing polymerizable composition and adhering to the nickel base.

The adhesive strength between the cycloolefin-based polymer and the nickel base in the test sample was measured at a crosshead speed of 0.1 mm/min with a tensile tester 5 times in total, and the average of the 5 measured values was calculated. The result is shown in Table 1.

Example 2

A test sample was prepared in the same manner as in Example 1 except that the base used in measurement of the adhesive strength was changed from the nickel base to a copper base, and the adhesive strength was measured in the same manner as in Example 1. The results are shown in Table 1.

Example 3

(Preparation of Monomer Mixture)

An RIM monomer (available from ZEON Corporation), dicyclopentadiene monoepoxide (DCPME), and bicycloheptenylethyltrimethoxysilane were mixed to prepare a monomer mixture having a composition shown in Table 1. The RIM monomer has the same composition as that in Example 1.

(Preparation of Catalyst Solution)

0.3 parts of a ruthenium catalyst (Zhan1N) represented by Formula (8) as the metathesis polymerization catalyst, 39.7 parts of 2,6-di-t-butyl-p-cresol (BHT, antioxidant), and 30 parts of triphenylphosphine were dissolved in 30 parts of cyclopentanone to prepare a catalyst solution.

(Preparation of Polymerizable Composition)

3.5 parts of the catalyst solution was added to 100 parts of the monomer mixture heated to 40° C., and these were mixed to prepare a polymerizable composition.

(Measurement of Viscosity)

The polymerizable composition and silica (MLR-1114, available from Tatsumori Ltd.) as a filler were mixed to prepare a filler-containing polymerizable composition containing 30.0% by mass of the polymerizable composition and 70.0% by mass of silica. The viscosity was measured in the same manner as in Example 1 except that the resulting filler-containing polymerizable composition was used. The results are shown in Table 1.

(Measurement of Adhesive Strength)

A test sample was prepared in the same manner as in Example 1 except that the filler-containing polymerizable composition prepared above was used, and the adhesive strength was measured in the same manner as in Example 1. The results are shown in Table 1.

Example 4

A test sample was prepared in the same manner as in Example 3 except that the base used in the measurement of the adhesive strength was changed from the nickel base to a copper base, and the adhesive strength was measured in the same manner as in Example 3. The results are shown in Table 1.

Comparative Examples 1 and 2

Monomer mixtures having compositions shown in Table 1 were prepared in the same manners as in Examples 3 and 4 except that bicycloheptenylethyltrimethoxysilane was replaced by vinylsilane (available from Shin-Etsu Chemical Co., Ltd., vinyltrimethoxysilane (KBM-1003)). A polymerizable composition and a filler-containing polymerizable composition were prepared in the same manners as in Examples 3 and 4, respectively, except that the monomer mixtures having compositions shown in Table 1 were used, and were measured for the viscosity and the adhesive strength in the same manners as in Examples 3 and 4. The results are shown in Table 1.

Comparative Examples 3 and 4

Monomer mixtures having compositions shown in Table 1 were prepared in the same manners as in Examples 3 and 4 except that bicycloheptenylethyltrimethoxysilane was not used. A polymerizable composition and a filler-containing polymerizable composition were prepared in the same manners as in Examples 3 and 4, respectively, except that the monomer mixtures having compositions shown in Table 1 were used, and were measured for the viscosity and the adhesive strength. The results are shown in Table 1.

TABLE 1

| | Composition of monomer mixture | | | | Viscosity of filler-containing polymerizable composition | | |
|---|---|---|---|---|---|---|---|
| | RIM-M (wt %) | DCPME (wt %) | Bicycloheptenyl-ethyltrimethoxy-silane (wt %) | Vinyl-trimethoxy-silane (wt %) | Viscosity 100 rpm (mPa · s) | Viscosity 10 rpm (mPa · s) | Thixotropic properties 10 rpm/100 rpm |
| Example 1 | 96.7 | 2.0 | 1.3 | 0 | 1,083 | 1,205 | 1.1 |
| Example 2 | 96.7 | 2.0 | 1.3 | 0 | | | |
| Example 3 | 97.1 | 2.2 | 0.7 | 0 | 452 | 487 | 1.1 |
| Example 4 | 97.1 | 2.2 | 0.7 | 0 | | | |
| Comparative Example 1 | 97.1 | 2.2 | 0 | 0.7 | 2,076 | 6,150 | 3.0 |
| Comparative Example 2 | 97.1 | 2.2 | 0 | 0.7 | | | |
| Comparative Example 3 | 97.8 | 2.2 | 0 | 0 | 2,168 | 30,350 | 14.0 |
| Comparative Example 4 | 97.8 | 2.2 | 0 | 0 | | | |

| | Evaluation of adhesion of cycloolefin-based polymer Adhesive strength (MPa) | | | | | | |
|---|---|---|---|---|---|---|---|
| | Base | Average | 1 | 2 | 3 | 4 | 5 |
| Example 1 | Nickel | 4 | 3 | 3 | 5 | 3 | 4 |
| Example 2 | Copper | 5 | 5 | 9 | 4 | 4 | 4 |
| Example 3 | Nickel | 6 | 9 | 6 | 8 | 3 | 4 |
| Example 4 | Copper | 5 | 3 | 8 | 5 | 6 | 4 |
| Comparative Example 1 | Nickel | 0 | (Peeled) | (Peeled) | (Peeled) | (Peeled) | (Peeled) |
| Comparative Example 2 | Copper | 0 | (Peeled) | (Peeled) | (Peeled) | (Peeled) | (Peeled) |
| Comparative Example 3 | Nickel | 0 | (Peeled) | (Peeled) | (Peeled) | (Peeled) | (Peeled) |
| Comparative Example 4 | Copper | 0 | (Peeled) | (Peeled) | (Peeled) | (Peeled) | (Peeled) |

Table 1 shows that the polymerizable compositions comprising the cycloolefin-based monomer represented by General Formula (I), the silane coupling agent having at least one hydrocarbon group having a norbornene structure, and the metathesis polymerization catalyst maintained a low viscosity and had thixotropic properties (static viscosity) hardly increased even after compounded with a large amount of the filler. Table 1 also shows that use of the polymerizable compositions resulted in cycloolefin-based polymers highly adhesive to the metals (Examples 1 to 4).

In contrast, Table 1 shows that in the cases where the silane coupling agents without a hydrocarbon group having a norbornene structure were used and where the silane coupling agent was not used, the polymerizable compositions had a high viscosity and increased thixotropic properties (static viscosity), and the resulting cycloolefin-based polymers had reduced adhesion to metals (Comparative Examples 1 to 4).

The invention claimed is:

1. A polymerizable composition comprising:
at least one of a cycloolefin-based monomer (α) represented by General Formula (I) and a cycloolefin-based monomer (β) represented by General Formula (II), a silane coupling agent having at least one hydrocarbon group having a norbornene structure, and a metathesis polymerization catalyst:

(I)

where $R^1$ represents a substituent selected from the group consisting of $C_1$ to $C_{10}$ hydrocarbon groups, halogen atoms, and $C_1$ to $C_{10}$ hydrocarbon groups substituted by a halogen atom: m represents an integer of 0 or more and 6n+6 or less; when m is 1 or more, $R^1$ can be bonded to any bonding position; when m is 2 or more, $R^1$s may be the same or different; and n represents an integer of 1 to 3;

(II)

where h represents an integer of 1 to 3, i and j each independently represent an integer of 0 to 4, and k represents an integer of 1 to 4.

2. The polymerizable composition according to claim 1 further comprising an (meth)acrylate monomer.

3. The polymerizable composition according to claim 2, wherein at least one of the cycloolefin-based monomer (α) and the cycloolefin-based monomer (β) and the (meth)acrylate monomer are contained in a mass ratio (cycloolefin-based monomer(s)/(meth)acrylate monomer) of 20/80 to 80/20.

4. The polymerizable composition according to claim 1, wherein the silane coupling agent comprises a compound represented by General Formula (III):

(III)

where $R^2$ and $R^3$ are any groups which may be the same or different, X is a hydrocarbon group having a norbornene structure, g and f are an integer of 0 to 3, p is an integer of 1 to 4, and g+f+p=4.

5. The polymerizable composition according to claim 1, wherein the polymerizable composition is composed of 2 or more preparative blend solutions each of which alone is not capable of polymerization, and can be formed by combining the preparative blend solutions.

6. A filler-containing polymerizable composition comprising the polymerizable composition according to claim 1 and a filler.

7. The filler-containing polymerizable composition according to claim 6, wherein the filler is an inorganic filler.

8. A cycloolefin-based polymer prepared by polymerizing the polymerizable composition according to claim 1.

9. A metal/resin composite comprising the cycloolefin-based polymer according to claim 8 and a metal adhering to at least part of a surface of the cycloolefin-based polymer.

10. A cycloolefin-based polymer prepared by polymerizing the filler-containing polymerizable composition according to claim 6.

11. A metal/resin composite comprising the cycloolefin-based polymer according to claim 10 and a metal adhering to at least part of a surface of the cycloolefin-based polymer.

\* \* \* \* \*